Nov. 13, 1923.
W. F. PRIDEMORE
ADJUSTABLE SPINDLE BOLT
Filed Aug. 25, 1922
1,474,057
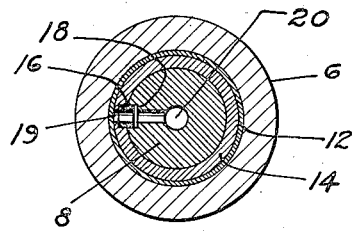
FIG. 2
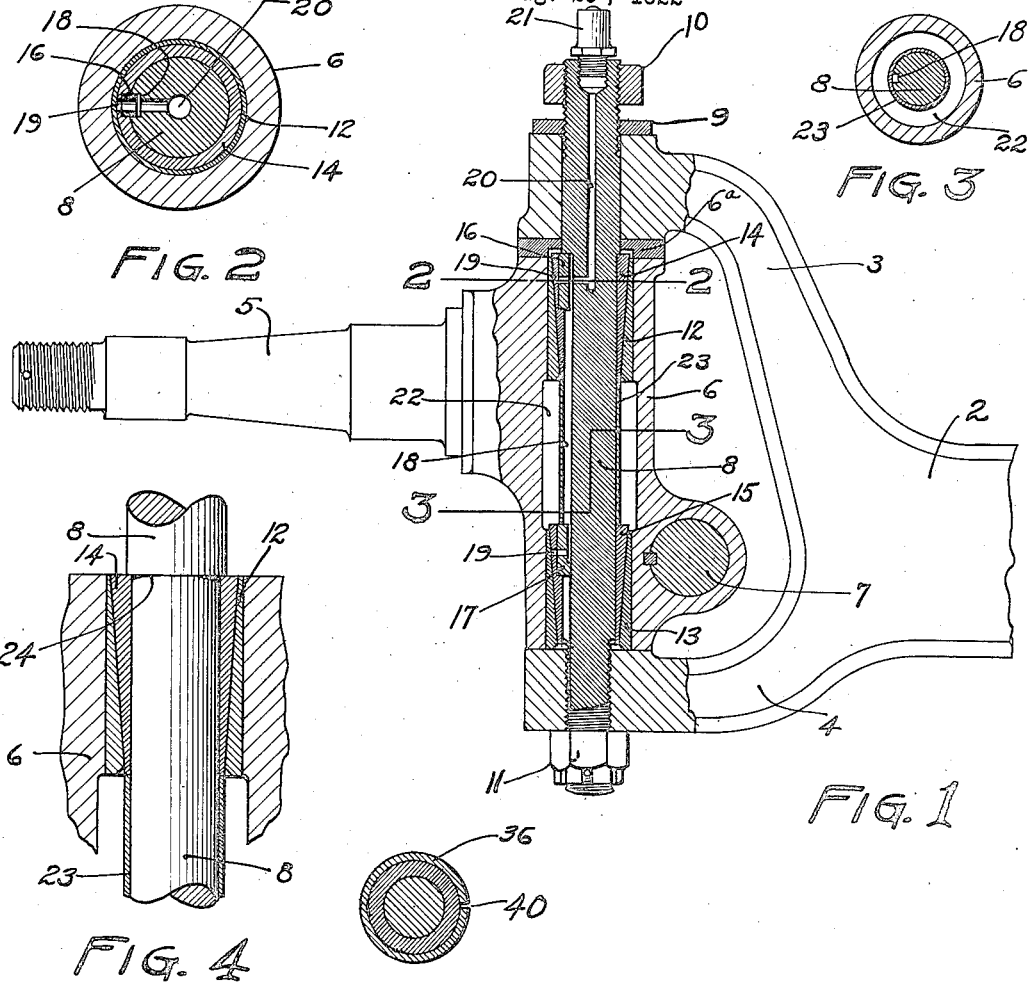
FIG. 3
FIG. 1
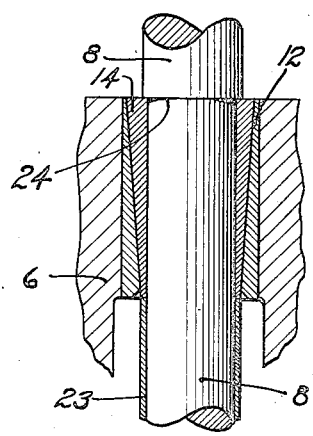
FIG. 4
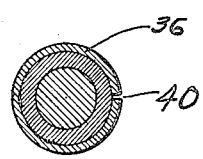
FIG. 6
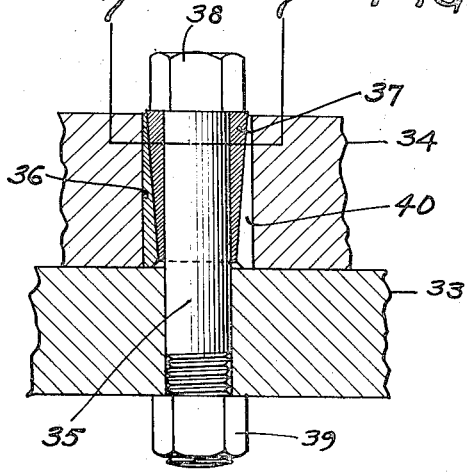
FIG. 5
INVENTOR
WILLIAM F. PRIDEMORE
By Paul, Paul & Moore
ATTORNEYS Patented Nov. 13, 1923.

1,474,057

UNITED STATES PATENT OFFICE.

WILLIAM F. PRIDEMORE, OF STILLWATER, MINNESOTA.

ADJUSTABLE SPINDLE BOLT.

Application filed August 25, 1922. Serial No. 584,377.

*To all whom it may concern:*

Be it known that I, WILLIAM F. PRIDEMORE, a citizen of the United States, resident of Stillwater, county of Washington, State of Minnesota (post-office address 208 Commercial Avenue), have invented certain new and useful Improvements in Adjustable Spindle Bolts, of which the following is a specification.

The object of my invention is to provide a bolt adapted for adjustment for the purpose of taking up wear or lost motion in a bearing.

A further object is to provide a bolt adjustment of simple inexpensive construction, and one capable of use with different devices requiring bolt adjustment but particularly adapted for the spindle bolt of a power vehicle.

The invention consists generally in various constructions and combinations all as hereinafter described and pointed out in the claims.

In the accompanying drawings forming part of this specification,

Figure 1 is a detail view partially in section showing a vehicle wheel spindle bolt embodying my invention.

Figure 2 is a sectional view on the line 2—2 of Figure 1.

Figure 3 is a sectional view on the line 3—3 of Figure 1.

Figure 4 is a detail sectional view of the upper portion of the bolt showing the adjusting means therefor.

Figure 5 illustrates another type of bolt adjustment.

Figure 6 is a sectional view on the line 7—7 of Figure 6.

In the drawing, 2 represents the forward axle of an automobile having the upper arm 3 and lower arm 4 of a fork.

5 represents the wheel spindle having a hub 6 provided with the usual connection 7 to the steering mechanism of the machine. The usual thrust collar 6ª is interposed between the upper end of the hub 6 and the under face of the arm 3.

8 represents the spindle bolt passing vertically through the arms 3 and 4 and through the hub 6 of the spindle. This bolt is threaded at the ends and provided with lock and adjusting nuts 9, 10, and 11.

Within the hub 6, at each end thereof, I provide tapered rigidly secured outer bushings 12 and 13, and correspondingly tapered reversely arranged inner bushings 14 and 15 are mounted on the bolt, and these inner bushings are provided with interiorly formed lugs 16 and 17 to enter a keyway 18 in the bolt, and prevent the bushings turning thereon.

Ports 19 are provided in these inner bushings communicating with the keyway 18, and a duct 20 is formed in the upper end of the bolt leading to a plug 21 through which a lubricant can be introduced into the bearing.

A chamber 22 is formed in the hub intermediate to its ends and a sleeve 23 encircles the bolt within this chamber and contacts with the ends of the bushings 14 and 15 and prevents the lubricating material from flowing out of the keyway or groove into the chamber 22, guiding it from the upper bearing to the lower one. The bolt has a shoulder 24 formed thereon to contact with the bushing 14 and force it down to its seat within the bushing 12, a well lubricated bearing surface being provided between the inner and outer bushings to allow the hub of the spindle to turn freely and smoothly. A sleeve 23 also serves as a means for transmitting the movement of the inner bushing 14 to the corresponding bushing 15 at the lower end of the bearing. In case there is wear and lost motion in the bearing, resulting from continued use, the lock-nuts 9 and 11 are loosened and the bolt adjusted until the lost motion disappears and the spindle turns smoothly in its support. In this way, I am able to maintain the desired adjustment for an ordinary spindle bolt compensating easily for wear, and insuring the true oscillation of the spindle at all times.

In Figures 6 and 7, another modification is shown, where members 33 and 34 are shown seated upon one another with a connecting bolt 35 between them. A tapered bushing 36 is inserted into the orifice into the member 34, and a similar bushing 37 reversely arranged, is mounted on the bolt and engaged by the head 38 and forced into the bushing 36 and against its tapered inner surface. As shown at 40 in Figure 7, the outer bushing 36 contacting with the member 33 is divided or split longitudinally so that it may expand under internal pressure against the walls of the orifice when the nut 39 is tightened, thus rigidly securing or locking together the two members 33 and 34.

This device is particularly adapted for taking up the wear and lost motion in the spindle hub of certain well-known makes of cars as it is only necessary to remove the straight bushings provided in the ends of the spindle hubs of these cars and substitute therefor the inner and outer bushings shown herein, all without the necessity of taking the car to a shop or boring the hub of the spindle or in fact doing any machine work thereon. In assembling the parts, the outer and inner bushings are placed in the ends of the hub, the outer bushings fitting snugly and being held in place by their engagement with the walls of the hub and before the insertion of the upper pair of bushings, the sleeve 23 is put in place with its lower end resting upon the inner bushing 15 and its upper end in position to be engaged by the inner end of the bushing 14. Then when the bolt is put in place, the keys 16 and 17 enter the bolt keyway and the bolt slides down through the bushings until its lower thread end projects through the lower fork of the axle, while its shoulder near its upper end is in contact with the bushing 14. The surface of the bolt at the lower end adjacent its threaded portion is cut away as indicated in Figure 1 so that longitudinal adjustment of the bolt is possible for the purpose of drawing the bushings together and taking up the wear between them. With this device, the wear and lost motion between the spindle bolt and the hub can be easily and quickly compensated for.

I claim as my invention:

1. A bolt adjusting means comprising an outer casing of substantially uniform internal diameter, a bushing fitting the interior of the outer casing, said bushing having an internal tapered surface, an inner bushing having an external tapered surface to contact with the tapered inner surface of the outer bushing, a bolt fitting within said inner bushing and having means for contacting the end of the inner bushing to draw said bushings together when the bolt is tightened.

2. The combination with an axle fork, a hub of substantially uniform internal diameter, a bolt passing through the arms of said fork and through said hub and provided with threaded ends and adjusting nuts, bushings interposed between said bolt and the inner wall of the hub and separable from the bolt and hub and having oppositely tapered surfaces for taking up wear or lost motion when said bolt is adjusted longitudinally.

3. The combination with an axle having a forked end, a wheel spindle having a hub of substantially uniform internal diameter fitting between the ends of said fork, a bolt passing through said forked ends and through said hub and having adjusting nuts, oppositely tapered inner and outer bushings arranged in pairs one within the other between said bolt and the end portions of said hub, and means for engagement with the inner bushings of said pairs for moving them longitudinally to take up lost motion or wear in the bearing when said bolt is adjusted longitudinally.

4. The combination with an axle fork of a wheel spindle having a hub of substantially uniform internal diameter interposed between the ends of said fork, a bolt passing through said hub and having adjusting nuts, tapered outer bushings fitting within the hub at the ends thereof, inner bushings tapered oppositely to said outer bushing mounted on said bolt and fitting within said outer bushings, said bolt having a shoulder to engage one of said inner bushings for forcing it into the enclosing bushing, and means for transmitting the pressure from one inner bushing to the other inner bushing when said bolt is moved lengthwise.

5. The combination with an axle having a forked end with holes therethrough, and a wheel spindle having a hub of substantially uniform internal diameter fitting between the ends of said fork, a bolt passing through said hub and holes and provided with lock and adjusting nuts, oppositely tapered inner and outer bushings arranged in pairs one within the other between said bolt and the end portions of said hub, means for drawing the inner bushings of the pairs together when said bolt is adjusted longitudinally, said bushings being adapted for mounting on said bolt and within said hub without inserting them through the bolt holes in said axle ends.

In witness whereof, I have hereunto set my hand this 21st day of August, 1922.

WILLIAM F. PRIDEMORE.